US009264879B1

(12) United States Patent
Reeves et al.

(10) Patent No.: US 9,264,879 B1
(45) Date of Patent: Feb. 16, 2016

(54) MANAGING RESOURCE USAGE OF A MOBILE DEVICE

(75) Inventors: Raymond Emilio Reeves, Olathe, KS (US); Simon Youngs, Overland Park, KS (US); Gary Duane Koller, Overland Park, KS (US); Mark Douglas Peden, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 910 days.

(21) Appl. No.: 13/488,785

(22) Filed: Jun. 5, 2012

(51) Int. Cl.
*H04W 4/26* (2009.01)
*H04M 15/00* (2006.01)

(52) U.S. Cl.
CPC ............. *H04W 4/26* (2013.01); *H04M 15/66* (2013.01)

(58) Field of Classification Search
CPC ......... H04W 4/24; H04W 4/26; H04M 15/60; H04M 15/66; H04M 15/705; H04M 15/8083; H04M 15/88; H04M 2215/0108; H04M 2215/0116; H04M 2215/0184; H04M 2215/0188; H04M 2215/22; H04M 2215/70; H04M 2215/7009

USPC .................................................. 455/405–408
See application file for complete search history.

(56) References Cited

U.S. PATENT DOCUMENTS

| 2007/0136195 | A1* | 6/2007 | Banjo ............................ 705/43 |
| 2011/0054990 | A1* | 3/2011 | Bogdan ....................... 705/14.17 |
| 2011/0237238 | A1* | 9/2011 | Hassan et al. ............... 455/422.1 |
| 2013/0086252 | A1* | 4/2013 | Cutler et al. .................. 709/224 |

* cited by examiner

*Primary Examiner* — George Eng
*Assistant Examiner* — Marcus Hammonds

(57) ABSTRACT

Methods and systems for managing resource usage of a mobile device based on a resource threshold of a wireless communications network. A resource policy is received from a mobile device. The resource policy indicates that a network resource manager associated with a wireless communications network is authorized to use the resource policy to control the resource usage of the mobile device to support a resource threshold level of the wireless communications network. The wireless communications network is associated with a service provider of the mobile device. It is then determined that the wireless communications network has met the resource threshold. Upon determining that the wireless communications threshold has met the resource threshold, the resource usage of the mobile device is limited using the received resource policy of the mobile device.

20 Claims, 5 Drawing Sheets

MANAGING RESOURCE USAGE OF A MOBILE DEVICE

SUMMARY

A high-level overview of the invention is provided here to disclose and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, systems and methods for managing resource usage of a mobile device based on a resource threshold of a wireless communications network, and specifically managing services and applications running on the mobile device (e.g., video, voice, and texts) based on the resources required to provide wireless communications services within the wireless communications network. Wireless communications services may include data, voice, and messaging services provided to the mobile device. The wireless communications services may be associated with a plurality of access components and service components that require resources within the wireless communications network to provide wireless communications services to the mobile phone. A network resource manager receives a resource policy for a mobile device indicating that a network resource manager associated with the wireless communications network is authorized to use the resource policy to control the resource usage of the mobile device to support a resource threshold of the wireless communications network. The network resource manager may limit the resource usage of the mobile device based on a determination that the wireless communications threshold has been met and using the received resource policy of the mobile device.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
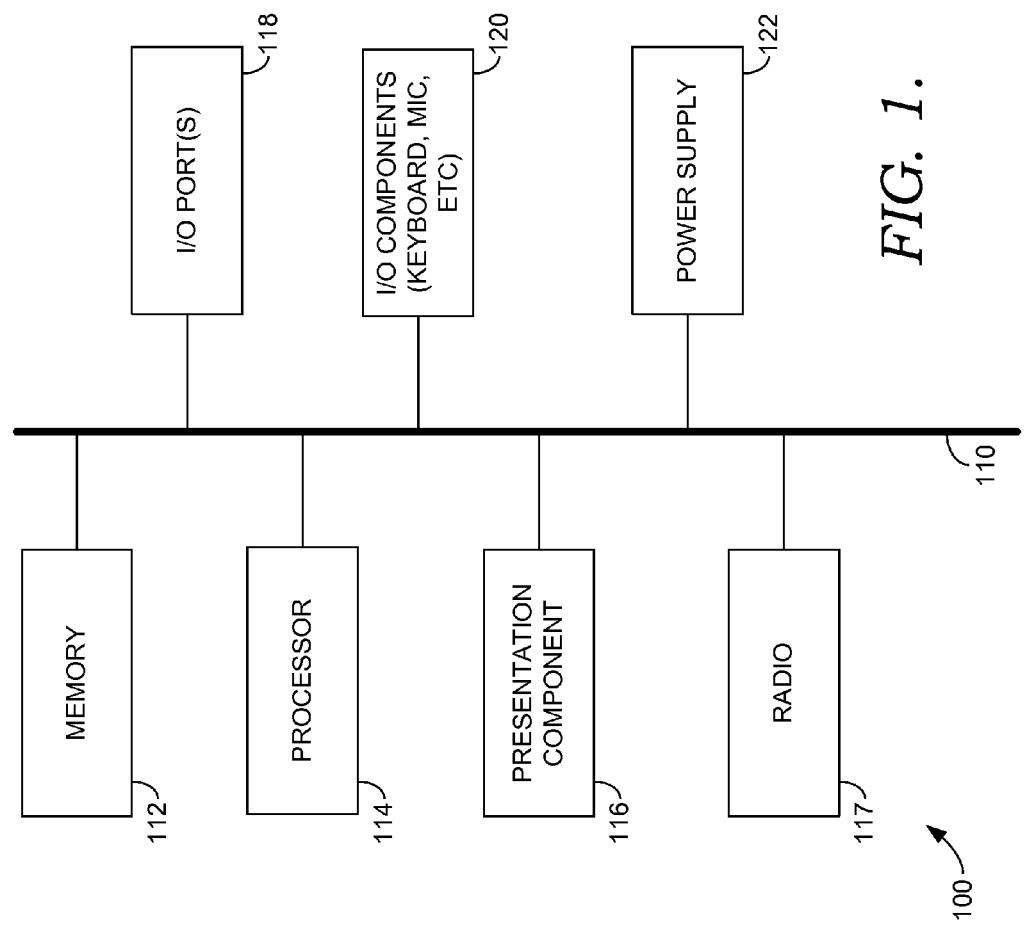
FIG. 1 depicts a block diagram of a mobile device in accordance with an embodiment of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

AAA Authentication, Authorization, and Accounting
BTS Base Transceiver Station
CDMA Code Division Multiple Access
FA Foreign Agent
GGSN GPRS Gateway Support Node
GPRS General Packet Radio Service
GSM Global System for Mobile communications (Groupe Spécial Mobile)
HA Home Agent
HTTP Hypertext Transfer Protocol
IP Internet Protocol
LED Light Emitting Diode
LTE Long Term Evolution
MDN Mobile Device Number
PDA Personal Data Assistant
PDSN Packet Data Serving Node
RNC Radio Network Controller
SMS Short Messaging Service
TDMA Time Division Multiple Access
UMTS Universal Mobile Telecommunications System Further, various technical terms are used throughout this description. An illustrative resource that fleshes out various aspects of these terms can be found in Newton's Telecom Dictionary, 25th Edition (2009).

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

As mentioned, embodiments of the present invention are directed toward managing resource usage of a mobile device based on a resource threshold of a wireless communications network, and specifically registering a resource policy with a service provider network resource management subscription plan associated with the wireless communications network. Embodiments of the present invention provide an efficient and simple method for a network resource manager to maintain available resources in a wireless communications network (e.g., CDMA, GSM, and TDMA) by reducing the consumption of resources of a mobile device. In general, mobile devices consume network resources even when in an idle state; for example, a user may not actively send messages or make voice calls; however, the mobile device may still consume wireless communications network resources with passive activity on the mobile device (e.g., location-based services, automatic updates, push notifications, and application notifications). In many cases, users are unaware of the passive activity (e.g., multiple ongoing sessions that consume significant amounts of wireless network resources). Some users may not have the need for one or all of these services during particular periods, but the services leave both access components and/or service components burdened by a large volume of zero-value services that still impact network capacity and cost of service. As such, the network resource manager may limit the resource usage of the mobile device based on a resource policy.

Embodiments may provide users with a common interface that will support opting in or opting out of network resource management through a mobile device of the user. In one embodiment, opting in may be by subscription to a network resource management subscription plan. Further, the user may be incentivized to opt in to a network management subscription plan because of a rewards plan that grants credits and/or discounts for a mobile device that participates in network resource management via a mobile device. Rewards may be based on a calculated amount of limited resource usage of the mobile device. Rewards may also be higher for opting the mobile device in during peak times of resource usage of the wireless communications network. A device registration server, described in more detail herein, accepts registration requests and receives a resource policy from a user; the resource policy authorizes a network resource manager to control resource usage of the mobile device using the user preferences in the resource policy. The system may provide users a method for configuring user preferences in a resource policy that the network resource manager uses to control the resource usage on the mobile device; for example, the user may identify periods of limited to no-use, or services that could be suspended on the mobile device. The device registration forwards the resource policy to the network resource manager. The network resource manager further communicates with a client resource manager to facilitate control of the resource usage on the mobile device. In this regard, the network resource manager resolves network resource usage issues by limiting the resource usage of a mobile device using a resource policy and also providing a benefit for users who would otherwise not require services during identified periods.

Embodiments of the present invention introduce a process for the user opting in to network resource management that will improve the performance of the wireless communications network by limiting the resource usage of a mobile device on the wireless communication network based on a determination that the wireless communications network has met a resource threshold. The resource threshold may be based, at least in part, on the resource threshold of access components and/or service components (e.g., radio network controllers, base station controllers, base transceiver stations, and mobile switching centers) within the wireless communications network that may be providing data, voice, messaging or other services to the mobile device. Upon determining that a resource threshold has been met, the network resource manager limits the resource usage of the mobile device. To limit the resource usage of a mobile device, an exemplary embodiment of the present invention controls the number of allowed communications associated with a particular originating mobile device. This will then reduce instances of poor wireless communications network performance; improve the efficiency in providing data, voice, and messaging services to users, improve the performance of individual access components and/or service components that provide services; and provide carriers with valuable information regarding customer usage that ultimately results in better traffic management and handling.

In a first aspect of the present invention, computer-readable media having computer-executable instructions embodied thereon that, when executed, enable a computing device to perform a method of managing resource usage of a mobile device based on a resource threshold of a wireless communications network is provided. The method includes receiving a resource policy from a mobile device indicating that a network resource manager associated with the wireless communications network is authorized to use the resource policy to control the resource usage of the mobile device to support a resource threshold of the wireless communications network. The wireless communications network is associated with a service provider of the mobile device. Further, the method includes determining that the wireless communications network has met the resource threshold and limiting the resource usage of the mobile device using the received resource policy of the mobile device.

In a second aspect of the present invention, computer-readable media having computer-executable instructions embodied thereon that, when executed, enable a computing device to perform a method of managing a resource usage of a mobile device based on a resource threshold of a wireless communications network is provided. The method includes registering a mobile device with a service provider network resource management subscription plan associated with the wireless communications network. The method further includes receiving a resource policy from the mobile device indicating that a network resource manager is authorized to use the resource policy to control resource usage of the mobile device to support a resource threshold of the wireless communications network. Additionally, the method includes determining that the wireless communications network has met the resource threshold. Upon determining that the wireless communications network has met the resource threshold, the method includes sending a first indication to the mobile device that the network resource manager has started control of the resource usage of the mobile device. The method also includes communicating with a client resource manager to facilitate control of the resource usage on the mobile device and sending a second indication that the resource manager has stopped control of resource usage of the mobile device.

In a third aspect of the present invention, a system is provided for managing the resource usage of a mobile device based on a resource threshold of a wireless communications network. The system includes a network resource manager configured for receiving a resource policy from a mobile device indicating that the resource manager is authorized to use the resource policy to control resource usage of the mobile device to support a resource threshold of a wireless communications network. The network resource manager further determines that the wireless communications network has met a resource threshold and upon determining that the wireless communications network has met a resource threshold, limiting the resource usage of the mobile device based on the resource policy of the mobile device. The system further includes a billing server configured for receiving a resource policy for a mobile device from the network resource manager. The resource policy comprises user preferences on how the network resource manager controls the mobile device. The billing server further generates rewards based at least in part upon user preferences in the resource policy.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display and a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touchscreens, and any other item usable to directly or indirectly input data into mobile device 100. Power supply 122 includes items such as batteries, fuel cells, or any other component that can act as a power source to power mobile device 100.

Figure 2:
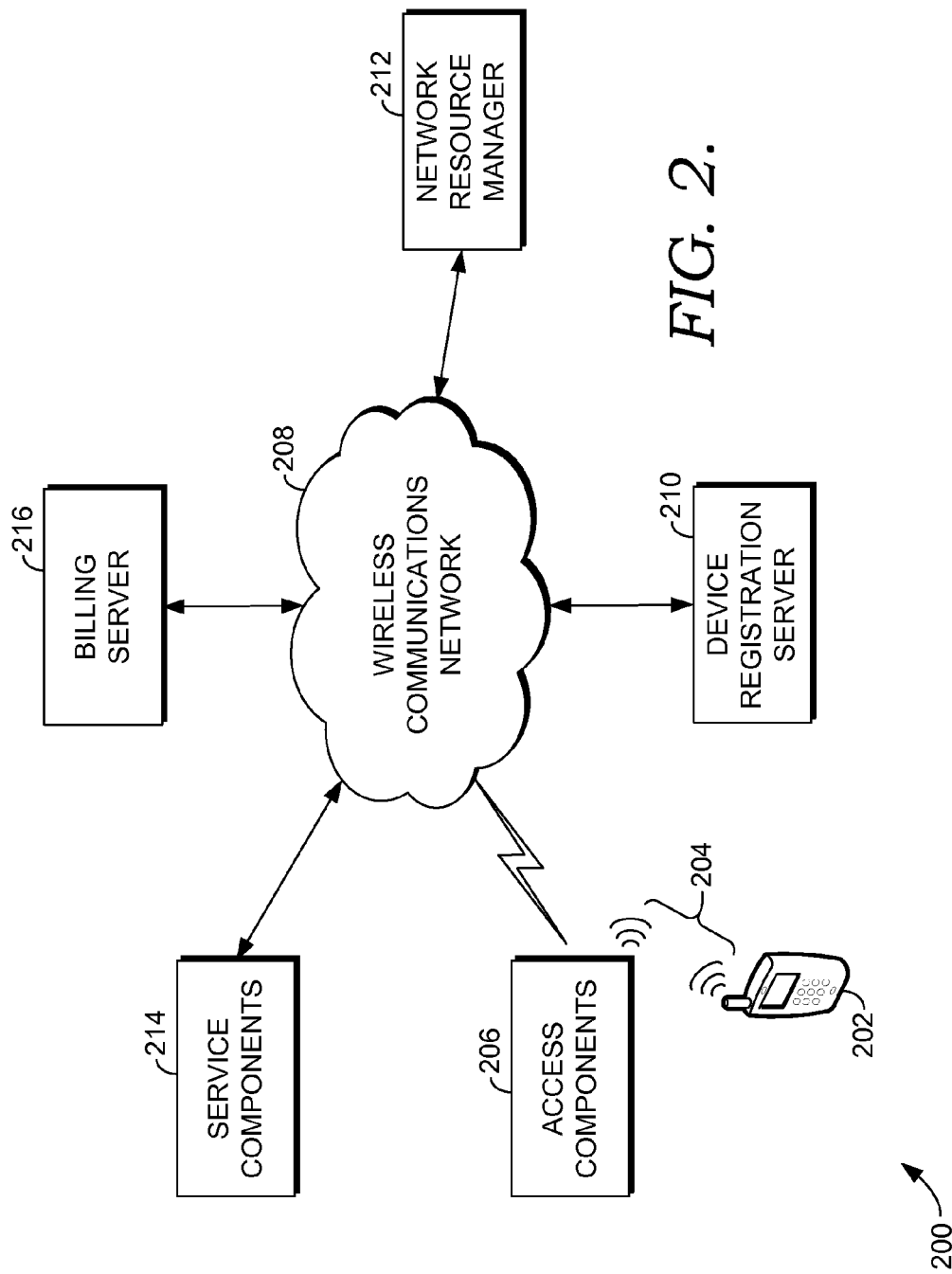
FIG. 2 depicts an illustrative operating system for carrying out embodiments of the present invention.

FIG. 2 depicts an illustrative operating environment, referenced generally by the numeral 200, and illustrates a networking environment that enables management of resource usage of a mobile device based on a resource threshold of a wireless communications network. Mobile device 202, in one embodiment, is the type of device described in connection with FIG. 1 herein. It may include a client resource manager (not shown) that helps carry out aspects of the technology described herein. The client resource manager may be a resident application on the handset, a portion of the firmware, a stand-alone website, or a combined application/web offering that is used to facilitate control of the resource usage of the mobile device. The client resource manager application may also receive user preferences to control the resource usage of the mobile device. Whenever we speak of an application, software, or the like, we are really referring to one or more computer-readable media that are embodied with a set of computer-executable instructions that facilitate various actions to be performed. For readability purposes, we will not always include this lengthy terminology. In one embodiment, the client resource manager communicates a resource policy through a wireless communications network 208 to a device registration server 210 to allow for the network resource manager 212 to manage the resource usage of the mobile device. The client resource manager may further facilitate control of the resource usage on the mobile device using the resource policy. For example, a client resource manager may receive a request from the network resource manager to disable a service running on a mobile device; the service has been identified in the resource policy authorizing the network resource manager to control the mobile device. The client resource manager may also apply user exceptions associated with a service on the mobile device.

Mobile device 202 communicates with access components 206 by way of a communications link 204. Communications link 204 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi connection to a device (e.g., mobile hotspot) that provides access to a wireless communications network, such as a WLAN connection using 802.11 protocol. A long-range connection may include a connection using one or more of CDMA, GPRS, GSM, TDMA, LTE, and 802.16.

Generally, the access components 206 provides access to what some skilled artisans refer to as a wireless communications network 208, also termed a core network. A wireless communications network 208 may comprise one or more of the components illustrated in FIG. 2. To the contrary, not all components that make up a wireless communications network are shown. Also, not all connections or possible connections are shown. The access components 206 may be one or more of a base transceiver station (BTS), a Wi-Fi Router, a Mobile Hotspot, and any other device that facilitates communication between mobile device 202 and network 208. In one embodiment, the access components 206 includes both a WiFi router and a BTS tower. In another embodiment, access components 206 may be BTS towers. A radio network controller (RNC) (not shown) performs various functions, such as managing radio channels, power control, load control, admission control, packet scheduling, handover control, macrodiversity, security functions, and mobility management. A base station controller (BSC) (not shown) acts as the intelligence behind base transceiver stations (BTS) (not shown), and handles allocation of radio channels, receives measurements from mobile devices, and controls handovers from one BTS to another BTS.

Service components 214 are responsible for managing various applications, services, etc., that are available via the wireless communications network 208 (e.g., data, voice, and messaging services). By way of example, a communications server (not shown) may manage how messages are sent in the wireless communications network 208. The communications sever may broadcast emails, voices, and other forms of communication to mobile devices associated with users (e.g., subscribers to a server provider using the wireless communications network) who are associated with the wireless communications network 208. The users may opt in to managing resource usage of the mobile device of the user based on the resource threshold of the wireless communications network 208.

Additional components illustrated in FIG. 2 include a device registration server 210, a network resource manager 212, and a billing server 216. Further, several components shown in FIG. 2 may be combined into a single component although shown separately in FIG. 2. The components illustrated in FIG. 2 may communicate with one another by way of the wireless communications network 208.

As mentioned, some components are not depicted in FIG. 2 so as to not obscure aspects of the various embodiments of the present invention. For instance, the wireless communications network 208 may include various components that are not shown. One of these components is a network-access gateway (not shown) that helps facilitate communication between the mobile device 202 and other networks (not shown) as well as the Internet (not shown). The network-access gateway is also known by some skilled artisans as a packet data serving node (PDSN). Similarly, others might refer to this device as a foreign agent. The network-access gateway helps manage communications sessions between the mobile device 202 and other components, such as the device registration server 210 and the network resource manager 212. Any device that provides similar functionality is contemplated within the scope of this disclosure. For example, a GSM offers similar functionality in networks that utilize GSM or UMTS technology.

At a high level, the network-access gateway helps provide access to the Internet as well as to other network technologies and application services. It helps provide mobile IP (MIP) access, one-agent support, and transportation of packets to facilitate the funneling or communicating of data through virtual private networks. It can act as a client for an authentication server (not shown), which helps ensure that mobile device 202 is authorized to communicate via the wireless communications network 208. In some embodiments, the authentication server is known as an authentication, authorization, and accounting (AAA) server. But it can be any device that helps authenticate mobile device 202. In one embodiment, a network-access gateway includes a set of computer-executable instructions that help carry out various aspects of technology described herein. Further, a home agent (not shown) may be included in the embodiment of FIG. 2. A home agent is a router on the mobile device's 202 home network that maintains information about the device's current location, which, in one embodiment, is identified in a care-of-address. This allows the mobile device 202 to keep the same IP address even when it connects from a different location. In one instance, the home agent works in conjunction with a foreign agent.

Generally, in this disclosure, when we speak of communicating data or information we are referring to any action that requires mobile device 202 to have an IP address to carry out some action. Mobile device 202 might attempt to access items such as the Internet as well as other components that might alone or in combination facilitate things such as television reception, email reception, picture mail, video mail, video conferencing, and the like.

A device registration server 210 is generally responsible for managing registration of a mobile device for network resource management. More specifically, the device registration server 210 provides an interface for receiving resource policies associated with mobile devices, which include general registration information and user preferences on how the network resource manager should control the resource usage of the mobile device. The resource policy may include, for instance, MDN, the cellular carrier, device type, contract term, and an opt-in flag. The resource policy may further include user preferences for how the network resource manager 212 may control the resource usage of the mobile device 202. For instance, the user may designate a period of limited or non-use (e.g. day of week, time of day) and/or specific services and application (e.g., PANDORA, FACEBOOK) that may be limited. By way of illustration, the user preferences in the resource policy may identify periods of limited to no-use by the user and/or services that could be suspended on the mobile device 202 when a resource threshold has been met on the wireless communications network 208. The resource policy may also include support for particular access components 206 and/or service components 214. The resource policy may include preconfigured policies or custom policies for control of the resource usage of the mobile device. The resource policy may also include subscription to a network resource management subscription plan. The network resource management subscription plan may be part of a rewards plan used to incentivize users to opt in to a network management because of a rewards plan that grant credits and/or discounts for a mobile device that participates in network resource management. As such, the device registration server 210 may facilitate configuring user preferences within the resource policy. In one embodiment, the device registration server 210 communicates with a client resource manager for receiving the resource policy of the mobile device.

The network resource manager 212 is generally responsible for managing the resource usage of the mobile device 202 based on the resource threshold of the wireless communications network. 208. More specifically, the network resource manager 212 receives a resource policy from a user opting in to a network management, indicating that the network resource manager 212 is authorized to control the resource usage of the mobile device. The resource policy may also be received from a device registration server. The network resource manager 212 also determines when a resource threshold for the wireless communications network 208 has been met. A resource threshold determines at which point the network resource manager 212 may begin to control resource usage of a mobile device 202 to improve resource allocation on the wireless communications network 208. A resource threshold may be based, at least in part, on access components 206 and/or service components 214. In one embodiment, the network resource manager 212 may monitor the resource threshold of the above referenced components and automatically limit the resources on a mobile device to compensate for a resources threshold on the wireless communications network 208. By way of example, the network resource manager 212 may monitor network traffic and bandwidth for a particular service (e.g., data, voice, and messaging) or monitor particular components in the wireless communications network 208 to determine whether a resource threshold has been met. In another embodiment, the network resource manager 208 may receive resource threshold alerts from one or more of the access components 206 and/or service components 214. Upon determining that a particular access components 206 and/or service components 214 has met a resource threshold, the network resource manager 212 may limit the resources on a mobile device.

Limiting the resources on a mobile device, in an embodiment, includes the limiting of a quantity or number of communications sent to and/or received from the mobile device. In yet another embodiment, limiting includes the prevention of all communications to and/or from the mobile device. In yet another embodiment, limiting includes subjecting communications sent to and/or received from the mobile device to additional filters and/or controls. For example, video stream bandwidth may be limited to a low-definition data stream. Moreover, the resource usage of the mobile device may be limited to balance network traffic load, create a predictable amount of traffic load, buffer network requests, improve processing and managing of network requests, and address power limitations within the network.

In one embodiment, the network resource manager 212 automatically starts and stops control of the resource usage of the mobile device 202 without any overt indication to the mobile device 202. An indication may include evidence serving to point out or signal actual control or the beginning of control of the mobile device 202. An indication may also include any circumstance at the network resource manager 212 and/or the mobile device 202 accompanying the resource usage control of the mobile device. In another embodiment, when the network resource manager 212 starts control of the mobile device, the network resource manager 212 sends a first indication to the mobile device 202 and when the network resource manager 212 stops control of the resource usage of the mobile device, it sends a second indication to the mobile device. The network resource manager 212 may communicate with a client resource manager (not shown) to facilitate control of resource usage on the mobile device. In one embodiment, the network resource manager 212 is associated with a particular carrier or service provider, but in another embodiment, the network resource manager 212 is not associated with any particular carrier or service provider and may provide its services for mobile devices in various networks.

The billing server 216 is responsible for managing the network resource management rewards plan. The rewards plan incentivizes users to opt in to network resource management through a mobile device of the user. By opting in, a user may receive credits and/or discounts towards bills and/or any other services afforded by a service provider associated with the rewards plan. In one embodiment, the billing server 216 receives a resource policy for a mobile device and provides credits and/or discounts for the mobile device using user preferences selected in the resource policy. A reward amount may be based on a calculated amount of limited resources for the mobile device and/or a period of suspended service or type of service, or any combination thereof, for which the mobile device was limited. For example, a mobile device that the network resource manager 212 controls during peaks hours of resource usage on the wireless communications network or suspends a particularly resource heavy application (e.g., PANDORA), may be granted additional credits and/or discounts.

Figure 3:
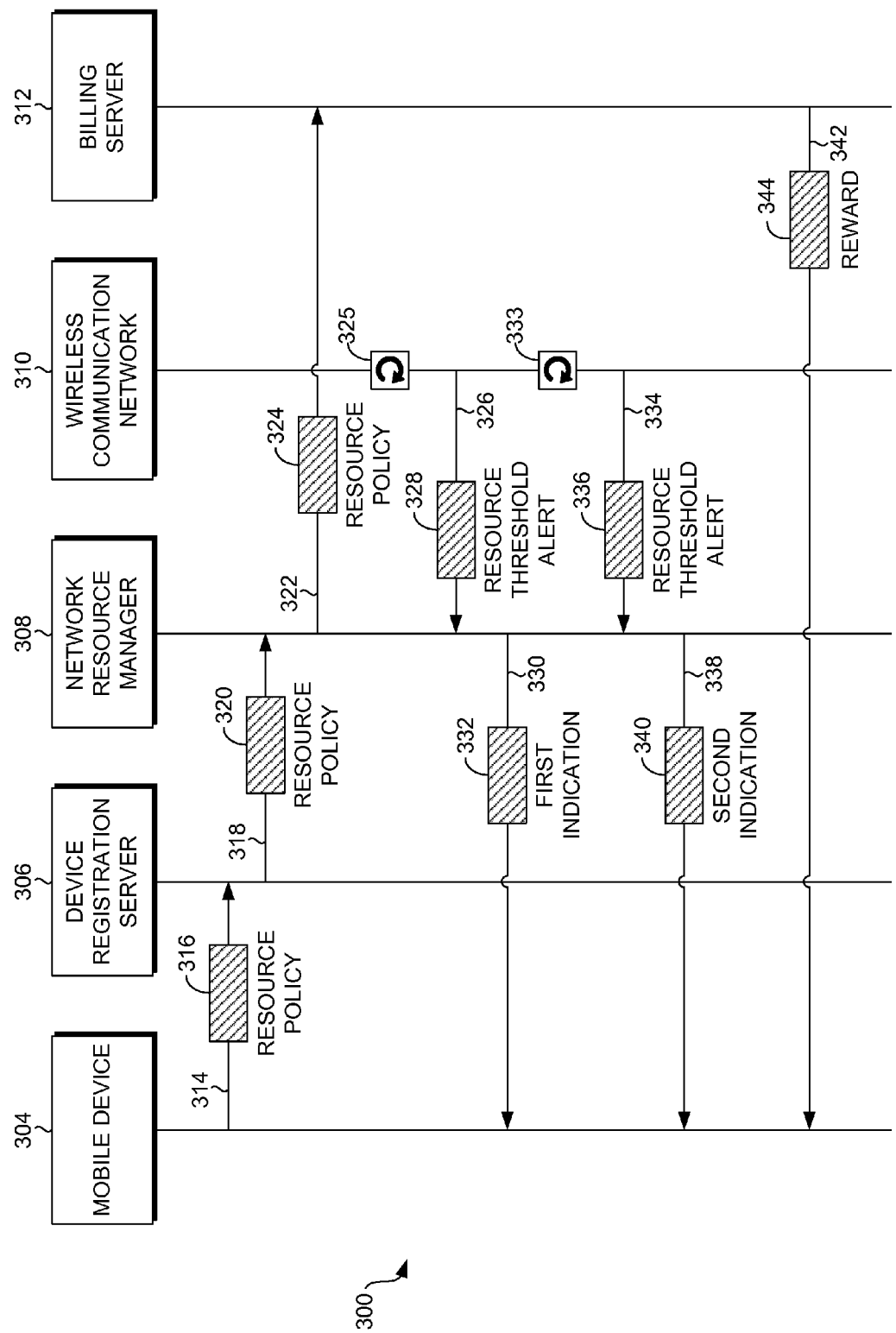
FIG. 3 depicts a flow diagram illustrating a method for managing resource usage of a mobile device based on a resource threshold of a wireless communications network, in accordance with an embodiment of the present invention.

Turning now to FIG. 3, a flow diagram depicts a method 300 for managing resource usage of a mobile device based on a resource threshold of a wireless communications network. Initially, the components illustrated in FIG. 3 include a mobile device 304, a device registration server 306, a network resource manager 308, a wireless communications network 310 and a billing server 312. The mobile device 304 registers 314 a resource policy 316, to the device registration server 306. The resource policy may include general registration information (e.g., device type, MDN, opt-in flag) and user preferences on how the network resource manager 308 should control the resource usage of the mobile device 304. In one embodiment, the resource policy may be from a device other than the mobile device indicating that the user would like to opt-in to the network resource manager control of the mobile device resource usage. In yet another embodiment, the mobile device may use a client resource manager to facilitate registration of the mobile device 304.

The device registration server 306 communicates 318 the resource policy 320 to the network resource manager 308. The resource policy 320 allows the network resource manager 308 control the resource usage of the mobile device 304 based on the resource threshold of the wireless communications network 310. The network resource manager 308 then communicates 322 the resource policy 324 to the billing server 312. This resource policy 324 allows the billing server 312 to understand how to set up the credits and/or discounts of the rewards plan. For instance, the rewards may be based on limiting the resource usage of the mobile device during peak hours of network resource usage and/or for particular types of services.

At step 325, once the mobile device 304 is registered with the network resource manager 308, the wireless communications network 310, communicates 326 a resource threshold alert 328 to the network resource manager 308 notifying the network resource manager 308 that the wireless communications network 310 has met a resource threshold. It should be noted that the resource threshold alert 328 may be communicated to the network resource manager 308 by the access components and/or service components, individually or in combination. The resource threshold alert 328 may include specific types of alerts for improving the performance of the network, including for instance, balance network traffic load, create a predictable amount of traffic load, buffer network requests, improve processing and managing of network requests, and address power limitations within the network. The resource threshold alert 328 may also be for particular services, such as, data, voice, or messaging services. In one embodiment, the network resource manager 308 may monitor the resource threshold of the above referenced components and automatically limit the resources on a mobile device to compensate for resources on the wireless communications network without a resource threshold alert from the wireless network.

Upon receiving a resource threshold alert 328 from the wireless communication network 310, the network resource manager 308 communicates 330 a first indication 332 to the mobile device that the network resource manager 308 has started control of the mobile device using the resource policy. At step 333, the network resource manager continues to control the resource usage of the mobile device. In one embodiment, the network resource manager may communicate with a client resource manager to facilitate control of resource usage on the mobile device. The wireless communications network 310 communicates 334 a resource threshold alert 336 to the network resource manager 308 notifying the network resource manager 308 that the wireless communications network 310 no longer meets a resource threshold. After the resource threshold alert 336 is received by the mobile device 304, the network manager 308 communicates 338 a second indication 340 to the mobile device that the network resource manager has stopped control of the mobile device using the resource policy. In one embodiment, the network resource manager 308 automatically starts and stops control of the resource usage of the mobile device without any overt indication to the mobile. In yet another embodiment, the resource threshold alert 336 is not received, the network resource manager 308 automatically sends a second indication to the mobile device 304 based on other information (e.g., user preferences in the resource policy).

With regard to the billing server 312, anytime after the resource policy 324 is received at the billing server 312, the billing server 312 then communicates 342 a reward 344 credit and/or discount to the mobile device 304. The rewards plan is an incentive for users to opt in to network resource management. Rewards may be based on a calculated amount of limited resource usage of the mobile device. Rewards may also be higher for opting the mobile device in during peak times of resource usage of the wireless communications network.

For exemplary purposes only, user X may register a resource policy with a user preference to suspend all data usage on a mobile device between 9 a.m. and 5 p.m. on Tuesdays. The mobile device is associated with a wireless communications network. A network resource manager may determine a resource threshold has been met on a service component for data usage on the wireless communications network. The network resource manager may limit the data usage on the mobile device using the resource policy to support the resource threshold of the wireless communications network.

Figure 4:
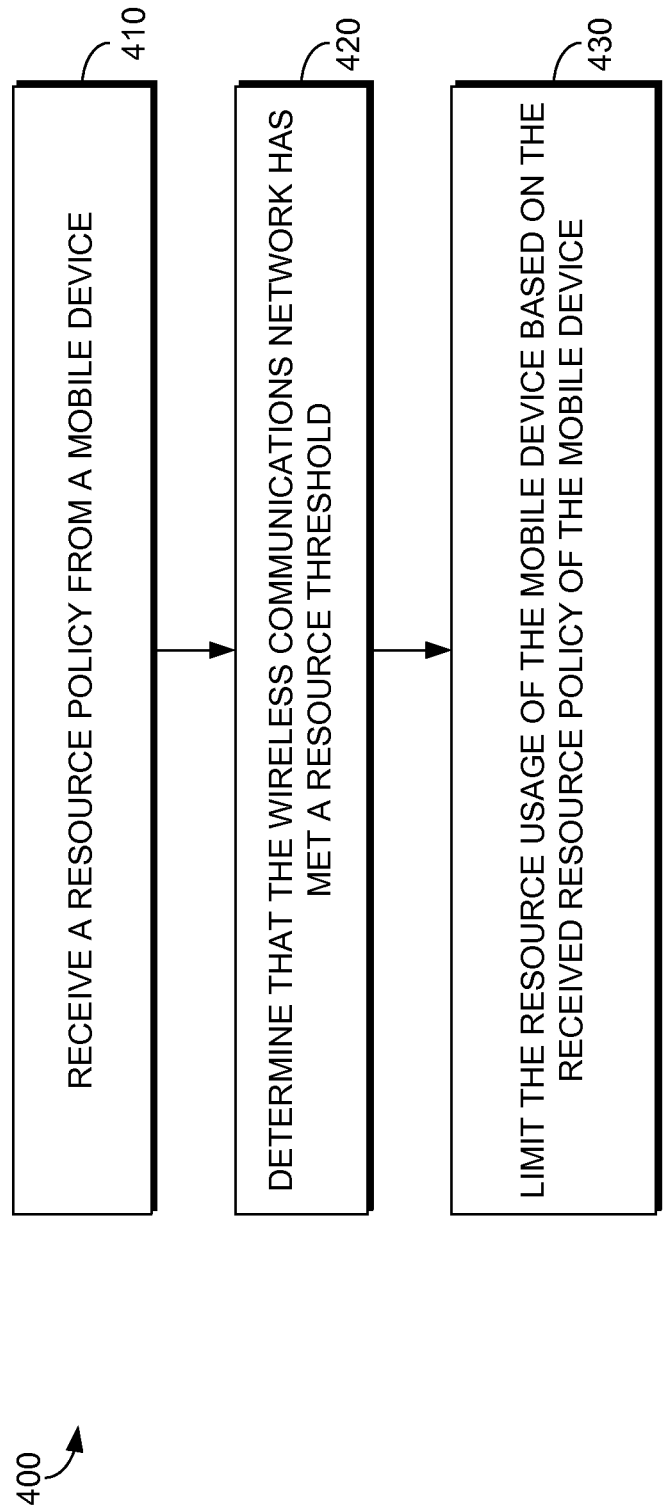
FIG. 4 depicts a flowchart illustrating a method for managing resource usage of a mobile device based on a resource threshold of a wireless communications network, in accordance with an embodiment of the present invention.

Referring to FIG. 4, a flowchart illustrates a method 400 for managing resource usage of a mobile device based on a resource threshold of a wireless communications network, in accordance with an embodiment of the present invention. Initially, at step 410, a resource policy is received from a mobile device. The resource policy provides the network resource manager with the understanding of user preferences on how to control the mobile device. Receipt of the resource policy indicates that a network resource manager to which the information is sent is authorized use the resource policy to control the resource usage of the mobile device to support a resource threshold of the wireless communications network. The wireless communications network is associated with a service provider of the mobile device. At step 420, it is determined that the wireless communications network has met the resource threshold, thus allowing the network resource manager to limit the resource usage of the mobile device using the received resource policy of the mobile device. The network resource manager limits the resource usage of the mobile device at step 430.

Figure 5:
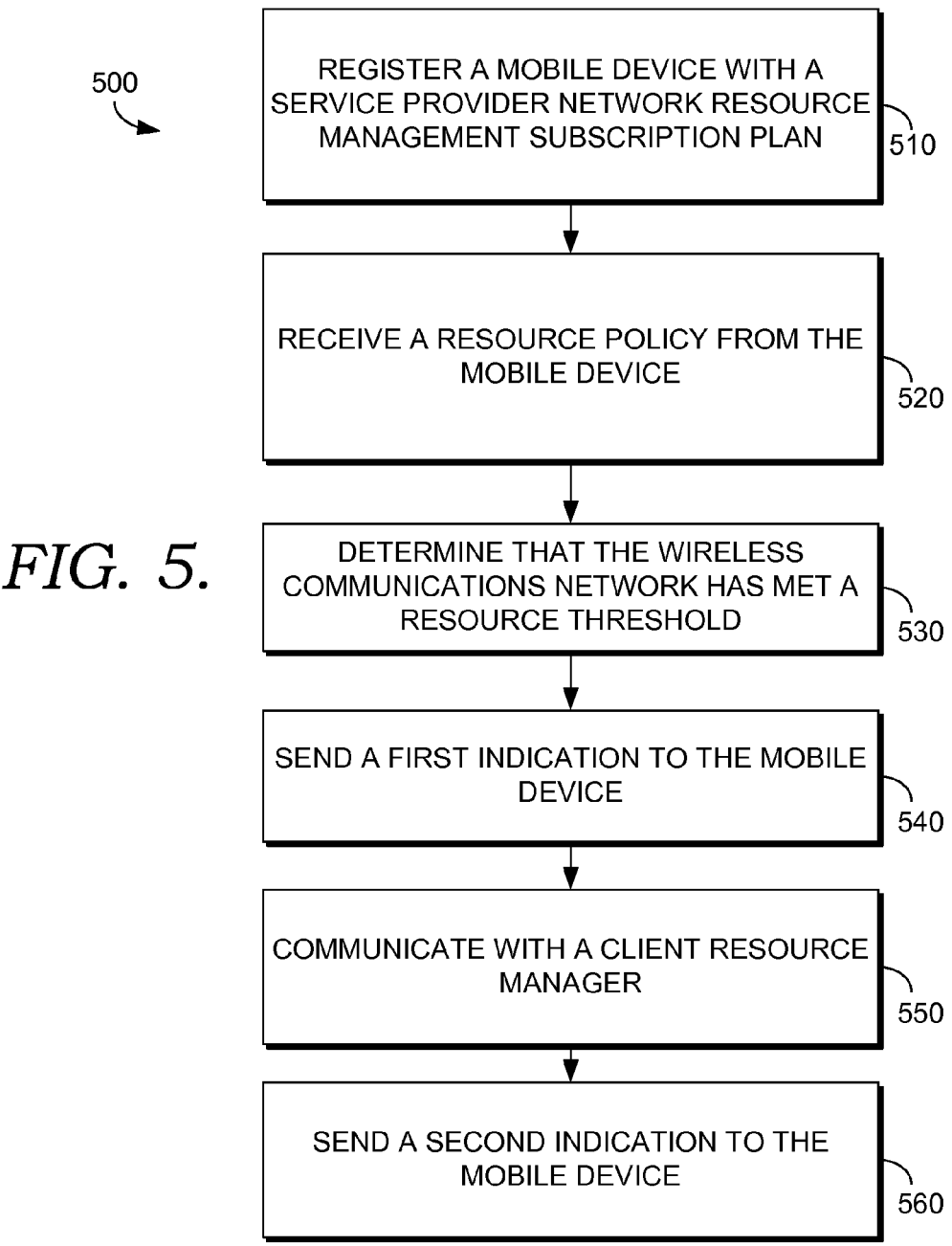
FIG. 5 depicts a flowchart illustrating a method for managing resource usage of a mobile device based on a resource threshold of a wireless communications network, in accordance with an embodiment of the present invention.

FIG. 5 depicts a flowchart illustrating a method 500 for managing resource usage of a mobile device based on a resource threshold of a wireless communications network. Initially, a mobile device is registered with a service provider network resource management subscription plan associated with the wireless network at step 510. A resource policy indicating that the network resource manager is authorized to use the resource policy to control resource usage of the mobile device to support a resource threshold of the wireless network is received at step 520. This registration of the resource policy provides the network manager with the understanding of user preferences on how to control the mobile device to support the wireless communications network.

At step 530, it is determined that the wireless communications network has met the resource threshold, thus allowing the network resource manager to limit the resource usage of the mobile device using the received resource policy of the mobile device.

At step 540, a first indication that the network resource manager has started control of the mobile device is sent to the mobile device from the network resource manager. The network resource manager communicates with a client resource manager to facilitate the resource usage of the mobile device at step 550. At step 560, a second indication that the network resource manager has stopped control of the mobile device is sent to the mobile device from the network resource manager.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer-implemented method of managing resource usage of mobile devices based on resource thresholds of wireless communications networks, the method comprising:
receiving a resource policy from a mobile device that is registered to a service provider network resource management subscription plan for a wireless communications network, the resource policy indicating that a network resource manager associated with the wireless communications network is authorized to use the resource policy to control the resource usage of the mobile device to support a resource threshold level of the wireless communications network;
determining that the wireless communications network has met the resource threshold;
upon determining that the wireless communications threshold has met the resource threshold, restricting the resource usage of the mobile device using the received resource policy of the mobile device; and
determining a reward for the network resource management subscription plan for the mobile device, wherein a portion of the reward is based in part upon a calculated amount of restricted resource usage of the mobile device during peak hours of wireless communications network traffic.

2. The method of claim 1, wherein the resource policy is received from a device other than the mobile device.

3. The method of claim 1, further comprising installing a client resource manager on the mobile device.

4. The method of claim 1, further comprising sending a confirmation message from the network resource manager indicating that the resource policy will control resource utilization of the mobile device.

5. The method of claim 1, wherein determining that the wireless communication network has met the resource threshold further comprises monitoring the wireless communications network traffic.

6. The method of claim 1, wherein determining that the wireless network manager has met the resource threshold is based at least in part upon the wireless communications network resource usage during peak hours.

7. The method of claim 1, further comprising:
sending a first indication to the mobile device that the network resource manager has started control of the resource usage of the mobile device; and
sending a second indication that the network resource manager has stopped control of the resource usage of the mobile device.

8. The method of claim 1, wherein the resource policy comprises preconfigured policies or custom polices for control of the resource usage of the mobile device.

9. The method of claim 8, wherein the resource policy comprises control of the resource usage of the mobile device based on a usage schedule of the mobile device.

10. The method of claim 8, wherein the resource policy comprises control of the resource usage of the mobile device based on a network service associated with the service provider of the mobile device.

11. The method of claim 8, wherein the resource policy comprises control of the resource usage of the mobile device based on a client service running on the mobile device.

12. The method of claim 1, wherein the resource policy comprises control of the resource usage based on an event.

13. Non-transitory computer readable media having computer-executable instructions embodied thereon that, when executed, enable a computing device to perform a method of managing resource usage of mobile devices based on resource thresholds of wireless communications networks, the method comprising:
registering a mobile device with a service provider network resource management subscription plan associated with the wireless communications network;
receiving a resource policy from the mobile device indicating that a network resource manager is authorized to use the resource policy to control resource usage of the mobile device to support a resource threshold of the wireless communications network;

determining that the wireless communications network has met the resource threshold;

upon determining that the wireless communications network has met the resource threshold, sending a first indication to the mobile device that the network resource manager has started control of the resource usage of the mobile device;

communicating with a client resource manager to facilitate control of the resource usage on the mobile device;

sending a second indication that the resource manager has stopped control of resource usage of the mobile device; and determining a reward for the network resource management subscription plan for the mobile device, wherein a portion of the reward is based in part upon a calculated amount of restricted resource usage of the mobile device during peak hours of wireless communications network traffic.

14. The media of claim 13, the method further comprising sending a confirmation message from the network resource manager indicating that the resource policy will control resource utilization of the mobile device.

15. The media of claim 13, wherein the resource policy comprises preconfigured policies or custom polices for control of the resource usage of the mobile device.

16. The media of claim 13, wherein communicating with the client resource manager on the mobile device to facilitate control of the mobile device usage, further comprises:

sending a request to the client resource manager application to disable a service, wherein the request comprises the duration for disabling the service; and capturing a call record detail comprising the service disabled and an actual duration of the disabled service.

17. The media of claim 16, wherein the first indication to the mobile device that the network resource manager has started control of the resource usage of the mobile device, is a request comprising at least one of:

a data call to the client resource manager; and a short messaging services (SMS) text messages.

18. The media of claim 16, wherein sending the second indication that the resource manager has stopped control of resource usage of the mobile device is based, at least in part, on a selection in the resource policy or mobile device.

19. A system managing resource usage of mobile devices based on resource thresholds of wireless communication networks, the system comprising:

a network resource manager configured for:
(1) receiving a resource policy from a mobile device that is registered to a service provider network resource management subscription plan for a wireless communications network, the resource policy indicating that the resource manager is authorized to use the resource policy to control resource usage of the mobile device to support a resource threshold of the wireless communications network,
(2) communicating with a client resource manager to facilitate control of the resource usage on the mobile device,
(3) determining that the wireless communications network has met a resource threshold, and
(4) upon determining that the wireless communication network has met the resource threshold, restricting the resource usage of the mobile device based on the resource policy of the mobile device;

a bill server configured for:
(1) receiving a resource policy for a mobile device from the network resource manager, wherein the resource policy comprises user preferences on how the network resource manager controls the mobile device, and
(2) generating rewards for the network resource management subscription plan for the mobile device based, at least in part, upon user preferences in the resource policy, wherein a portion of the rewards is based in part upon a calculated amount of restricted resource usage of the mobile device during peak hours of wireless network communication traffic.

20. The system of claim 19, wherein the client resource manager is further configured for:
(1) receiving a request from the network resource manager to disable a service, wherein the request comprises the duration for disabling the service,
(2) applying exceptions associated with a service on the mobile device, and
(3) executing the request from the network resource manager on the mobile device.

* * * * *